(12) United States Patent
Iwata et al.

(10) Patent No.: US 6,269,450 B1
(45) Date of Patent: Jul. 31, 2001

(54) COMPUTER MONITORING DEVICE

(75) Inventors: Hitoshi Iwata; Yasushi Nishibe; Yoshiharu Kawarazaki, all of Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/267,668

(22) Filed: Mar. 15, 1999

(30) Foreign Application Priority Data

Mar. 20, 1998 (JP) .................................................. 10-072297
Mar. 20, 1998 (JP) .................................................. 10-072298

(51) Int. Cl.[7] ..................................................... G06F 1/26
(52) U.S. Cl. ............................................. 713/340; 714/22
(58) Field of Search ............................... 713/340, 320, 713/300; 714/14, 22

(56) References Cited

U.S. PATENT DOCUMENTS 5,765,001 * 6/1998 Clark et al. .......................... 713/340
5,835,780 * 11/1998 Osaki et al. ......................... 713/300
5,923,099 * 7/1999 Bilir ..................................... 714/14
5,939,799 * 8/1999 Weinstein ............................ 714/14

\* cited by examiner

Primary Examiner—Glenn A. Auve
(74) Attorney, Agent, or Firm—Nixon Peabody LLP; Thomas W. Cole

(57) ABSTRACT

A computer monitoring device is provided which ensures safe operation, even when a power supply voltage supplied to a microcomputer decreases and causes the microcomputer to enter an abnormal state. When the power supply voltage decreases, the power supply circuit is switched to an auxiliary power supply which supplies power to a microcomputer monitoring circuit and signal processing circuit via a diode. The microcomputer monitoring circuit in turn provides a reset signal for the computer so that it can continue to operate, which ensures safe operation of the computer. The computer monitoring device is particularly useful in a power window system for a vehicle.

20 Claims, 6 Drawing Sheets

COMPUTER MONITORING DEVICE

BACKGROUND OF THE INVENTION

1. Field of the Invention

The present invention relates to a computer monitoring device for monitoring whether a normal operation is being carried out by a computer applied to control upward and downward movements of a window in a power window system for a vehicle, and detection of nipping of foreign matter by the window, or the like.

2. Description of the Related Art

Conventionally, in a system using a microcomputer, a power window system for a vehicle or the like, the microcomputer is operated by a stabilized power supply, which is controlled to have a constant voltage on the basis of a voltage energized from a battery (about 5 V). At this point, in order to prevent the microcomputer from malfunctioning (for example, an operation that causes a power window to operate contrary to the purpose of a switching operation due to a latch-up or the like of an active signal, or the like), when the microcomputer is in an abnormal state, an operational state of the microcomputer is monitored by a microcomputer monitoring circuit (i.e., a so-called watchdog timer circuit).

Specifically, when the microcomputer is operating normally, it outputs a pulse signal to the microcomputer monitoring circuit in a predetermined cycle. While this pulse signal is being detected by the microcomputer monitoring circuit, the microcomputer is thereby judged to be operating normally. When the microcomputer monitoring circuit cannot detect the pulse signal for a predetermined period of time or more, the microcomputer monitoring circuit assesses that the microcomputer is in an abnormal state. Then, the microcomputer monitoring circuit outputs a signal for prohibiting signal processing circuit from communicating with the microcomputer to the signal processing circuit, which outputs a signal for operating a power window, so as to prevent the power window from malfunctioning. Then, the microcomputer monitoring circuit outputs a reset signal to the microcomputer so as to restart the microcomputer.

In this way, it is ensured that the microcomputer operates safely when the microcomputer is in an abnormal state. However, if the power source supplied to the microcomputer monitoring circuit is also employed for the power source supplied to the microcomputer, when the power supply voltage supplied to the microcomputer decreases, the power supply voltage supplied to the microcomputer monitoring circuit also decreases. As a result, there arises a problem in that it is no longer possible to ensure safe operation for preventing the power window from malfunctioning or the like when the microcomputer is in an abnormal state.

SUMMARY OF THE INVENTION

In view of the aforementioned facts, it is an object of the present invention to provide a computer monitoring device in which safe operation can be ensured even when the power supply voltage supplied to a microcomputer decreases and the microcomputer thereby enters an abnormal state.

In order to accomplish the aforementioned object, a first aspect of the present invention is a computer monitoring device provided at a controller which operates a device to be controlled in accordance with a program built into a computer, comprising: a power supply circuit that supplies power to the computer; a monitoring circuit that is operated by the power supplied from the power supply circuit and monitors an operational state of the computer; an abnormality processing circuit that is operated by the power supplied from the power supply circuit and performs processing when the computer is operating abnormally; an auxiliary power supply that can supply power to at least one of the monitoring circuit and the abnormality processing circuit; and switching means that switches from the power supply circuit to the auxiliary power supply when a voltage value of the power supplied from the power supply circuit decreases to a value lower than a predetermined voltage value.

Alternatively, instead of the switching means, the present aspect may comprise voltage detecting means that detects the voltage of the power supply circuit, and switching control means which, on a basis of detection results of the voltage detecting means, switches from the power supply circuit to the auxiliary power supply when the voltage decreases to a value lower than a predetermined value.

In the first aspect of the present invention, the auxiliary power supply is provided for cases in which the power supply voltage supplied from the power supply circuit decreases. When the power supply voltage supplied from the power supply circuit decreases and the computer enters an abnormal state, the switching means switches from the power supply circuit to the auxiliary power supply. Alternatively, instead of the switching means, the present first aspect may comprise voltage detecting means that detects the voltage of the power supply circuit, and switching control means which, on a basis of detection results of the voltage detecting means, when the voltage decreases to a value lower than a predetermined value, switches from the power supply circuit to the auxiliary power supply. In this case, on the basis of the detection results of the voltage detecting means, the switching control means switches from the power supply circuit to the auxiliary power supply.

Then, power is supplied to the monitoring circuit and the abnormality processing circuit. For this reason, since the monitoring circuit and the abnormality processing circuit can continue to operate, processing for ensuring safe operation can be thereby performed.

A second aspect of the present invention is a computer monitoring device according to the first aspect of the present invention, wherein the switching means or the switching control means is a pair of diodes whose anode sides are respectively connected to an output end of the power supply circuit and an output end of the-auxiliary power supply, and whose cathode sides are connected to each other.

In accordance with the second aspect of the present invention, there is provided a computer monitoring device according to the first aspect of the present invention, the switching means or the switching control means is a pair of diodes whose anode sides are respectively connected to an output end of the power supply circuit and an output end of the auxiliary power supply, and whose cathode sides are connected to each other. Accordingly, the power supply circuit can be switched to the auxiliary power supply through a simple structure, and the power supply circuit and the auxiliary power supply are prevented from interfering with each other.

A third aspect of the present invention is a computer monitoring device provided at a controller which operates a device to be controlled in accordance with a program built into a computer, comprising: a power supply circuit controlling a voltage supplied from the power supply to be a constant voltage, and supplying power to the computer; a monitoring circuit that is operated by the power supplied from the power supply circuit and monitors an operational state of the computer; an abnormality processing circuit that is operated by the power supplied from the power supply circuit and performs processing when the computer is operating abnormally; an auxiliary power supply that can supply power to at least one of the monitoring circuit and the abnormality processing circuit; an overcurrent detecting circuit that detects an overcurrent supplied to the power supply circuit; and switching control means that, on a basis of a signal output from the overcurrent detecting circuit, switches from the power supply circuit to the auxiliary power supply.

In the third aspect of the present invention, the auxiliary power supply is provided for cases where the power supply voltage supplied from the power supply circuit decreases. When an overcurrent being supplied to the power supply circuit is detected by the overcurrent detecting circuit, the switching control means switches from the power supply circuit to the auxiliary power supply. Accordingly, power is supplied from the auxiliary power supply to the abnormality processing circuit. As a result, the abnormality processing circuit can continue to operate, and it is possible to perform processing for ensuring safe operation.

The fourth aspect of the present invention is the computer monitoring device wherein the auxiliary power supply operates effectively only when a predetermined signal is inputted.

In the fourth aspect of the present invention, since the operation of the auxiliary power supply is effective only when the predetermined signal is inputted, namely only when safe operation must be ensured, an increase in consumption of electrical current in a waiting state in which a signal is not inputted can be prevented.

DESCRIPTION OF THE PREFERRED EMBODIMENTS

With reference to the drawings, a description of an embodiment of the present invention will be given hereinafter.

Figure 1:
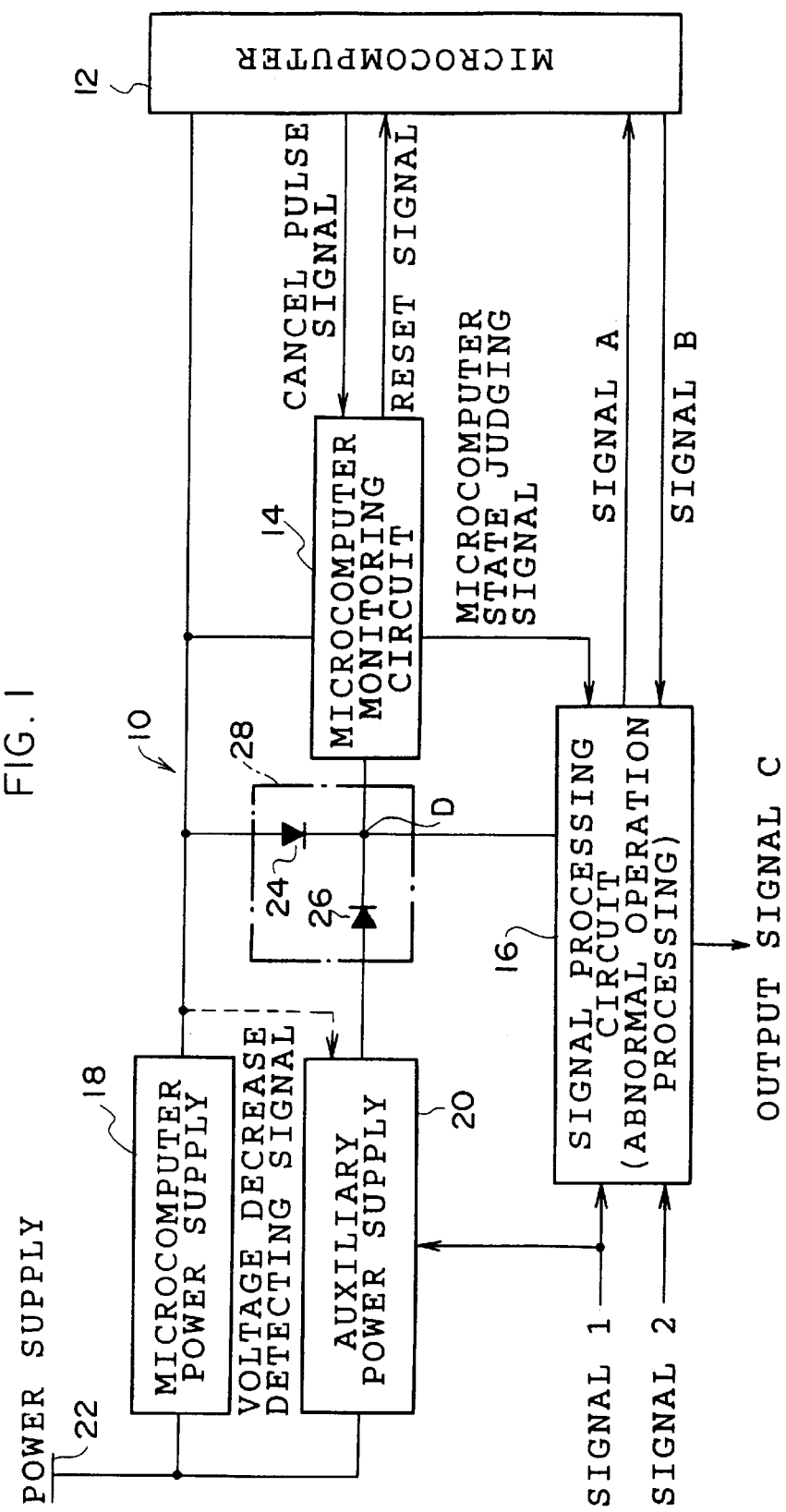
FIG. 1 is a block view that illustrates a schematic structure of a computer monitoring device according to an embodiment of the present invention.

A computer monitoring device 10 is shown in FIG. 1. This computer monitoring device 10 includes a microcomputer 12 comprising a CPU, a RAM, a ROM, and various interfaces, which are not shown in the figures and which are connected to each other via buses, a microcomputer monitoring circuit 14, signal processing circuit 16, a microcomputer power supply 18, and an auxiliary power supply 20.

In the signal processing circuit 16, signal processing is performed in accordance with an inputted signal 1 and a signal 2, and the processed signal is transmitted as a signal A to the microcomputer 12. The microcomputer 12 performs processing on the basis of the signal A outputted from the signal processing circuit 16, and outputs a signal B to the signal processing circuit 16. On the basis of the signal B outputted from the microcomputer 12, the signal processing circuit 16 performs signal processing, and outputs an output signal C. In the present embodiment, as an example, the signal 1 is an ignition signal for a vehicle, the signal 2 is an UP signal or a DOWN signal for vertically moving a door glass 100, which will be described later, and the output signal C is a signal for driving a motor 52 for vertically moving the door glass 100, which will be described later.

Figure 2:
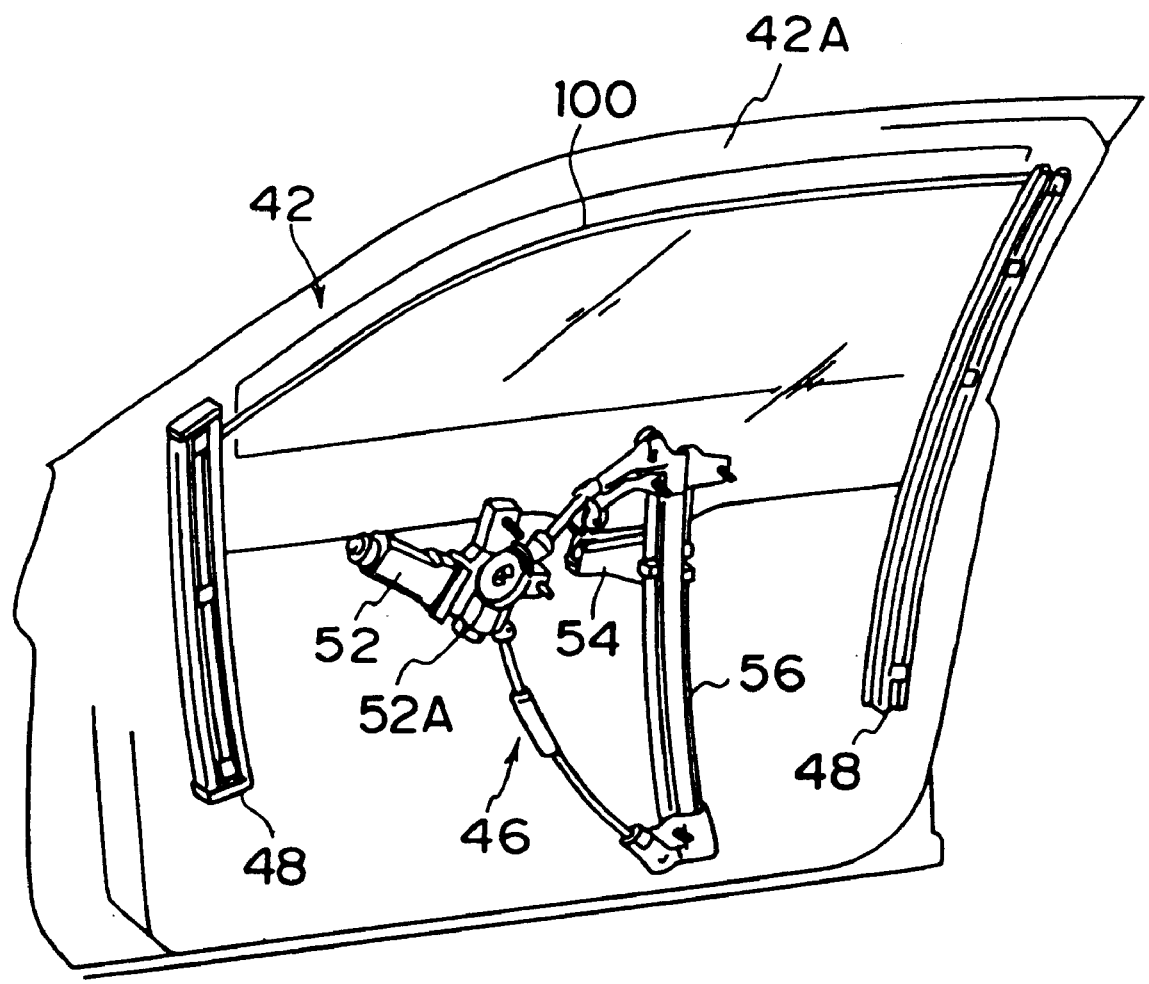
FIG. 2 is a schematic perspective view that illustrates an internal structure of a vehicle door at a driver's seat side according to the present embodiment.

An internal structure of a door 42 at a driver's seat side of a vehicle is shown in FIG. 2. As shown in FIG. 2, the motor 52 is provided inside a door at the driver's seat side. A window regulator portion 46 is connected to the motor 52. In the present embodiment, the window regulator portion 46 is a so-called wire type. An intermediate portion of a wire (not shown) is rolled around a rotating plate 52A which is mounted to a driving shaft of the motor 52. Each of the end portions of this wire is connected to a holding channel 54 for supporting the lower end portion of the door glass 100. Further, the holding channel 54 is attached to a main guide 56 so as to be vertically movable along the main guide 56.

When the motor 52 rotates in s normal or reverse directions, the rotation driving force is transmitted through a wire, and the door glass 100 moves vertically (ascends/descends) along glass guides 48. Further, a structure of the window regulator portion 46 is not limited to such a wire type as described above. Instead, an X arm type or a so-called motor self-traveling type in which the motor itself moves along a rack can be employed.

Due to the driving of the motor 52, when the door glass 100 moves upwardly, a peripheral end portion of the door glass 100 is fitted into a weather strip, which is made from a rubber (not shown) within a frame 42A of the door 42, and an opening with respect to the frame 42A is closed. Further, due to rotation driving of the motor 52, when the door glass 100 moves downwardly, the opening with respect to the frame 42A of the door 42 is opened.

In order to move the door glass 100 vertically, an unillustrated switch is operated, and when an UP signal or a DOWN signal is inputted as the signal 2 to the signal processing circuit 16, on the basis of the signal 2, the signal processing circuit 16 performs signal processing, and transmits the processed signal as a signal A to the microcomputer 12. In accordance with the signal A, the microcomputer 12 performs signal processing, and outputs a signal B to the signal processing circuit 16. Thereafter, in accordance with the signal B, the signal processing circuit 16 performs signal processing, outputs the output signal C for driving the motor 52, drives the motor 52, and moves the door glass 100 vertically.

The microcomputer monitoring circuit 14 for detecting abnormal operation of the microcomputer 12 is connected to the microcomputer 12. The microcomputer 12 outputs a cancel pulse signal to the microcomputer monitoring circuit 14 in a predetermined cycle. Further, the microcomputer 12 is restarted by a reset signal outputted from the microcomputer monitoring circuit 14.

While the cancel pulse signal, which is output from the microcomputer 12 in a predetermined cycle, is being input to the microcomputer monitoring circuit 14, the microcomputer monitoring circuit 14 assesses that the microcomputer 12 is operating normally. Accordingly, the microcomputer monitoring circuit 14 does not output a reset signal to the microcomputer 12, and sets a microcomputer state determination signal, which is output to the signal processing circuit 16, to be normal (for example, at a high level).

If the microcomputer monitoring circuit 14 can not detect a cancel pulse signal for a predetermined period of time or more, the microcomputer monitoring circuit 14 assesses that the microcomputer 12 is abnormal, outputs the reset signal to the microcomputer 12, restarts the microcomputer 12, and sets the microcomputer state determination signal, which is outputted to the signal processing circuit 16, to be abnormal (for example, at a low level). In this case, in order to prevent the output signal C from becoming abnormal and to prevent the vertical movement of the door glass 100 from operating abnormally, the signal processing circuit 16 is prohibited from communicating with the microcomputer 12. Namely, transmitting the signal A or receiving the signal B is prohibited, and the signal processing circuit 16 outputs the output signal C (e.g., a motor stopping signal) so as to prevent the door glass 100 from operating abnormally.

Further, even when the value of the voltage which is supplied to the microcomputer 12 is equal to or lower than the value at which the microcomputer can operate normally, the microcomputer monitoring circuit 14 outputs the reset signal to the microcomputer 12, restarts the microcomputer 12, operates in the same way as when the microcomputer monitoring circuit 14 can not detect the cancel pulse signal for a predetermined period of time or more.

The microcomputer power supply 18 is connected to the microcomputer monitoring circuit 14 and the microcomputer 12, converts the voltage supplied from a power supply 22 to a predetermined voltage (in the present embodiment, for example, 5 V), and supplies the voltage to the microcomputer monitoring circuit 14 and the microcomputer 12. Further, an anode side of a diode 24 is connected to the microcomputer power supply 18, and a cathode side of the diode 24 is connected to the cathode side of a diode 26, the microcomputer monitoring circuit 14, and the signal processing circuit 16.

An anode side of the diode 26 is connected to an auxiliary power supply 20, and the cathode side of the diode 26 is connected to the cathode side of the diode 24, the microcomputer monitoring circuit 14, and the signal processing circuit 16. The auxiliary power supply 20 converts the voltage supplied from the power supply 22 to a voltage that is slightly lower than the voltage supplied from the microcomputer power supply 18 and is a voltage at which the microcomputer monitoring circuit 14 and the signal processing circuit 16 can operate (in the present embodiment, for example, 4 V), and supplies the voltage to the microcomputer monitoring circuit 14 and the signal processing circuit 16 via the diode 26.

At this time, the potential at a point D, which is shown in FIG. 1, is about 4.3 V. Therefore, since the potential at the point D is higher than that of the auxiliary power supply 20, a current does not flow into the diode 26, and a current supplied from the microcomputer power supply 18 is supplied to the microcomputer monitoring circuit 14 and the signal processing circuit 16 via the diode 24. Namely, a structure is adopted that automatically switches from the microcomputer power supply 18 to the auxiliary power supply 20.

If the power supply voltage supplied from the microcomputer power supply 18 decreases due to a short circuit of a power supply-ground, for example, the potential at the point D also decreases, and the potential at the auxiliary power supply 20 becomes higher than the potential at the point D. Accordingly, the current supplied from the auxiliary power supply 20 is supplied to the microcomputer monitoring circuit 14 and the signal processing circuit 16 via the diode 26.

Or, as is shown by a dashed line in FIG. 1, a voltage decrease detecting signal can also be outputted to the auxiliary power supply 20. In this case, the auxiliary power supply 20 converts the voltage supplied from the power supply 22 to a predetermined voltage (in the present embodiment, for example, 5 V), and supplies the voltage to the microcomputer monitoring circuit 14 and the signal processing circuit 16 via the diode 26.

Further, the auxiliary power supply 20 samples the voltage decrease detecting signal outputted from the microcomputer power supply 18, and operates only when the voltage level of this voltage decrease detecting signal is lower than or equal to a predetermined voltage level (for example, 3 V).

When the power supply voltage supplied from the microcomputer power supply 18 decreases due to a short circuit of a power supply-ground, since the voltage level of the voltage decrease detecting signal also decreases, the auxiliary power supply 20 is thereby operated so as to supply power to the microcomputer monitoring circuit 14 and the signal processing circuit 16 via the diode 26.

When the microcomputer power supply 18 is normal, power is supplied from the microcomputer power supply 18 to the microcomputer monitoring circuit 14 and the signal processing circuit 16. When the microcomputer power supply 18 is abnormal, power is supplied from the auxiliary power supply 20 to the microcomputer monitoring circuit 14 and the signal processing circuit 16. The microcomputer power supply 18 and the auxiliary power supply 20 can be prevented from interfering with each other via a diode OR circuit 28, which is formed with the diodes 24 and 26.

An ignition signal (the signal 1) is inputted to the auxiliary power supply 20. The auxiliary power supply 20 operates only when this ignition signal is on (since the power window can move, it is necessary to ensure safe operation). Accordingly, when the ignition signal is off, i.e., in a waiting state (since the power window can not move, it is not necessary to ensure safe operation), an increase in consumption of electrical current is prevented.

If the auxiliary power supply 20 is made to operate effectively when the ignition signal is off, it is also possible to apply the auxiliary power supply 20 to a burglary prevention system.

With reference to the drawings, a detailed description of an operation of an embodiment of the present invention will be given hereinafter.

Start-up of the microcomputer 12 begins, when it receives power supplied from the microcomputer power supply 18. Simultaneous with start-up of the microcomputer 12, the microcomputer monitoring circuit 14 begins to monitor whether the microcomputer 12 is operating normally. The microcomputer monitoring circuit 14 assesses that the microcomputer 12 is in a normal state while the microcomputer monitoring circuit 14 detects the cancel pulse signal outputted from the microcomputer 12, and sets the microcomputer state determination signal, which is outputted to the signal processing circuit 16, at a high level (normal).

An unillustrated switch for vertically moving the door glass 100 is operated. When an UP signal or a DOWN signal is inputted as the signal 2 to the signal processing circuit 16, the signal processing circuit 16 performs processing on the basis of the signal 2, and the processed signal is transmitted as the signal A to the microcomputer 12. In accordance with the signal A, the microcomputer 12 performs processing, and the signal B is transmitted to the signal processing circuit 16. Then, in accordance with the signal B, the signal processing circuit 16 carries out processing, outputs the output signal C for driving the motor 52, drives the motor 52, and thereby moves the door glass 100 vertically.

When the power supply voltage supplied from the microcomputer power supply 18 decreases and the microcomputer 12 is in an abnormal state, the potential at the point D also decreases. Accordingly, the potential at the auxiliary power supply 20 becomes higher than the potential at the point D, and the current supplied from the auxiliary power supply 20 is supplied to the microcomputer monitoring circuit 14 and the signal processing circuit 16 via the diode 26. As a result, the microcomputer monitoring circuit 14 and the signal processing circuit 16 can continue to operate normally.

Or, as is shown by a dashed line in FIG. 1, if a voltage decrease detecting signal is outputted to the auxiliary power supply 20, when the power supply voltage supplied from the microcomputer power supply 18 decreases, and the microcomputer 12 is in an abnormal state, the voltage level of the voltage decrease detecting signal decreases. Accordingly, the auxiliary power supply 20 operates so as to supply power to the microcomputer monitoring circuit 14 and the signal processing circuit 16 via the diode 26. Therefore, the microcomputer monitoring circuit 14 and the signal processing circuit 16 can continue to operate normally.

Since the microcomputer is in an abnormal state, the microcomputer monitoring circuit 14 outputs the reset signal to the microcomputer 12, restarts the microcomputer 12, and sets the microcomputer state determination signal at a low-level (abnormal).

Since the microcomputer state determination signal outputted from the microcomputer monitoring circuit 14 is abnormal, the signal processing circuit 16 is prohibited from communicating with the microcomputer 12. Namely, transmitting the signal A and receiving the signal B is prohibited, and the signal processing circuit 16 outputs a motor stopping signal as the output signal C so as to prevent the vertical movement of the door glass 100 from operating abnormally. As a result, the door glass 100 does not operate abnormally.

Since the auxiliary power supply 20 operates only when the ignition signal (the signal 1) is on (since the power window can move, it is necessary to ensure safe operation), when the ignition signal is off, i.e., in a waiting state (since the power window can not move, it is not necessary to ensure safe operation), excessive consumption of electrical current can be prevented.

Figure 3:
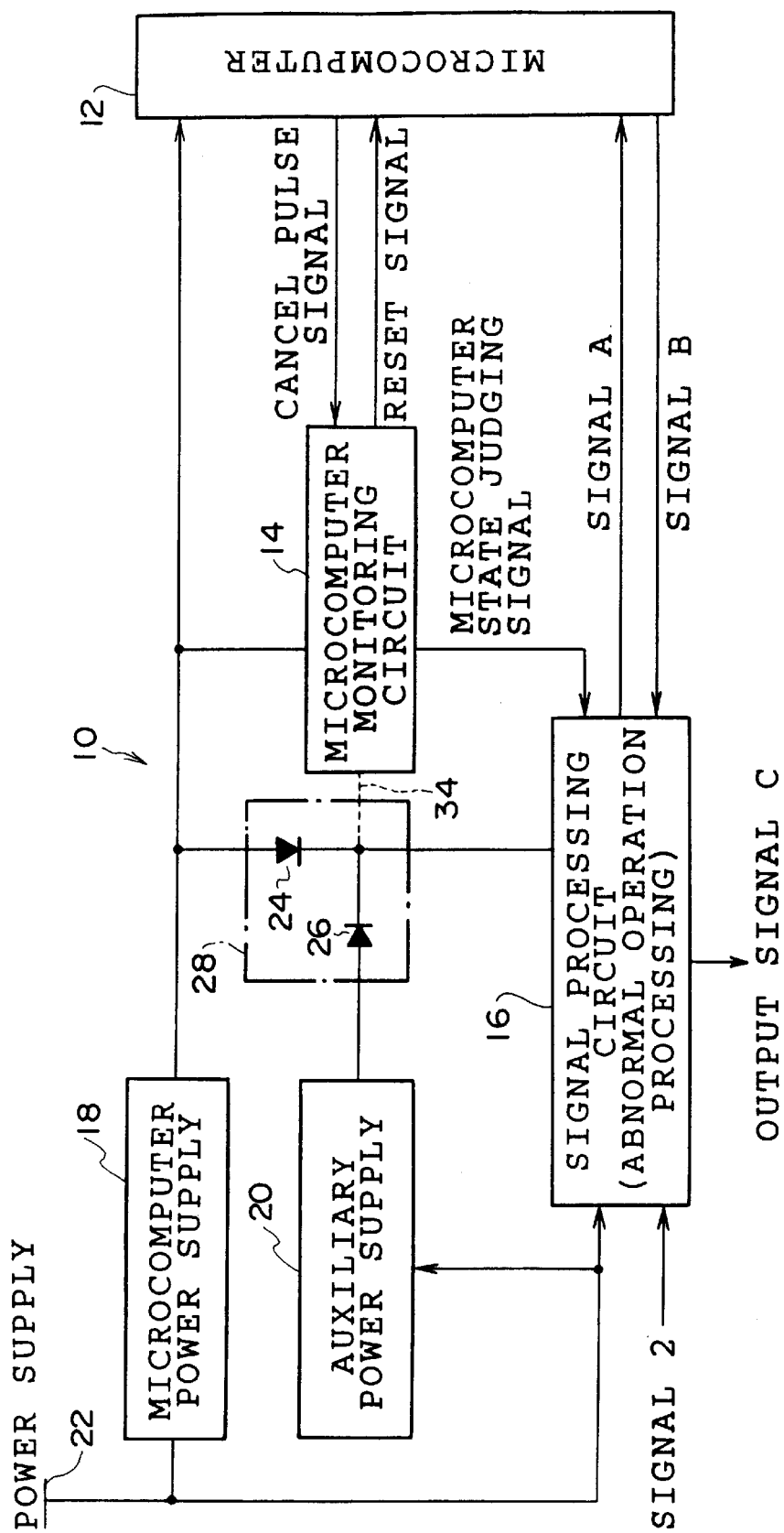
FIG. 3 is a block view that illustrates another example of a computer monitoring device according to the present embodiment.

When the input of the signal 1 can also be used as a power supply input, the signal 1 can be inputted as the power supply input to the auxiliary power supply 20 so as to operate the auxiliary power supply 20 as shown in FIG. 3. Further, if the microcomputer monitoring circuit 14 can be structured such that the microcomputer state determination signal outputted from the microcomputer monitoring circuit 14 is reliably set to be abnormal, when the power supply voltage supplied from the microcomputer power supply 18 decreases, it is thereby possible to eliminate an auxiliary power supply line 34, which is shown by a dashed line in this figure.

Figure 4:
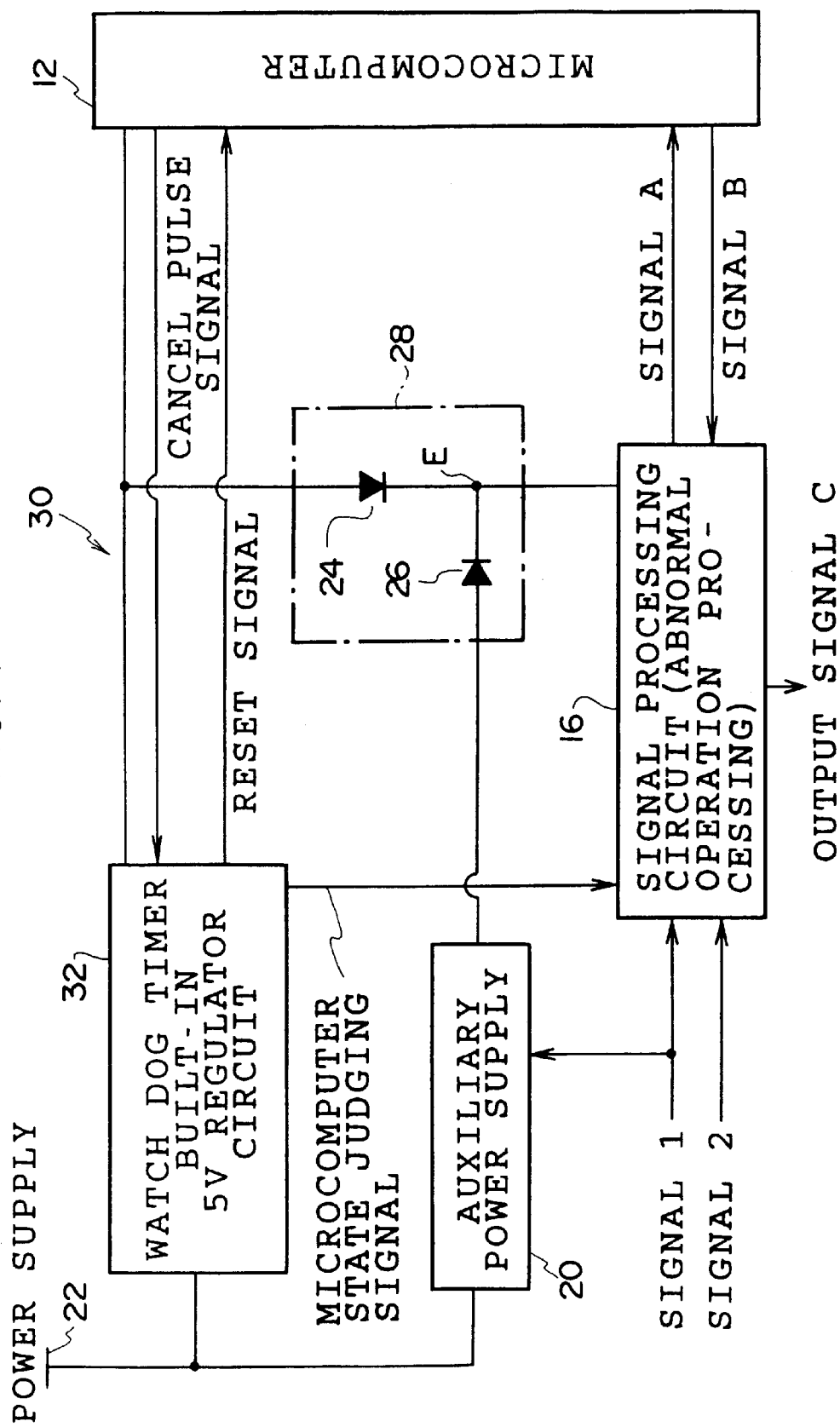
FIG. 4 is a block view that illustrates yet another example of a computer monitoring device according to the present embodiment.

Next, another example of a computer monitoring device according to the present invention is shown in FIG. 4. Portions identical to those of the computer monitoring device 10, which is shown in FIG. 1, are denoted by the same reference numerals, and a detailed description thereof will be omitted.

A computer monitoring device 30, which is shown in FIG. 4, has a watchdog timer built-in 5 V regulator circuit 32, which has a watchdog timer (a microcomputer monitoring circuit) built therein. The watchdog timer built-in 5 V regulator circuit 32 converts the power supply voltage supplied from the power supply 22 to 5 V, supplies the voltage to the signal processing circuit 16 and the microcomputer 12, and monitors the operational state of the microcomputer 12.

While the microcomputer 12 is operating normally (while the cancel pulse signal is detected by the watchdog timer built-in 5 V regulator circuit 32 having the watchdog timer (the microcomputer monitoring circuit) built therein), the microcomputer state determination signal is set at a high level (normal). While the microcomputer 12 is operating abnormally (while the cancel pulse signal is not detected by the watchdog timer built-in 5 V regulator circuit 32, for a predetermined period of time or more), the watchdog timer built-in 5 V regulator circuit 32 outputs the reset signal to the microcomputer 12, restarts the microcomputer 12, and sets the microcomputer state determination signal at a low level (abnormal). In this case, since the microcomputer 12 is in an abnormal state, the signal processing circuit 16 outputs the motor stopping signal as the output signal C, prevents the door glass 100 from operating abnormally, and ensures safe operation.

When the power supply voltage supplied from the watchdog timer built-in 5 V regulator circuit 32 decreases, the potential at a point E in this figure becomes lower than the potential at the auxiliary power supply 20. Accordingly, power is supplied from the auxiliary power supply 20 to the signal processing circuit 16, and processing can be continued. In this case, since the microcomputer state determination signal is set at a low level, the signal processing circuit 16 performs processing for ensuring safe operation in the same manner as described above.

Figure 5:
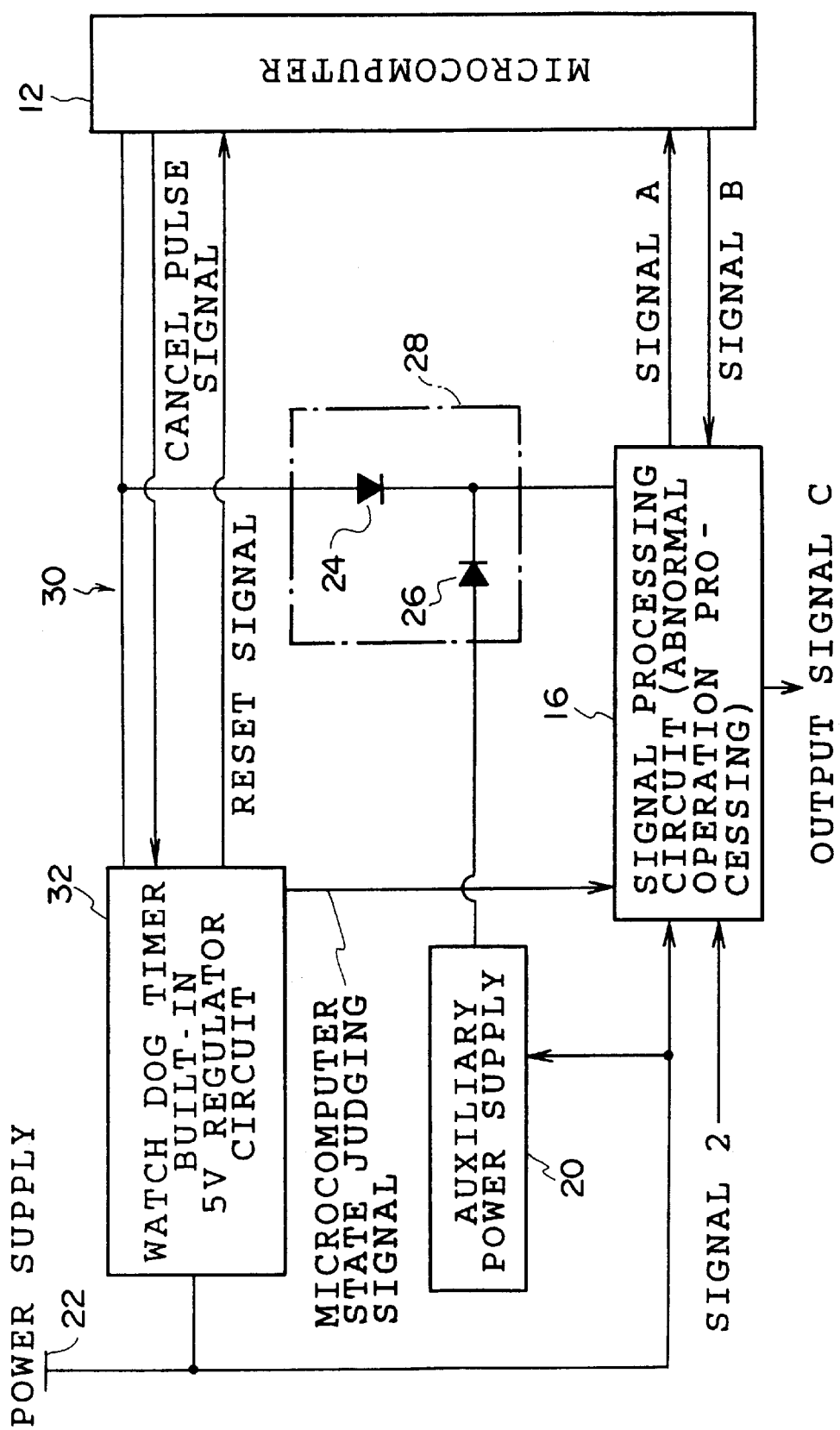
FIG. 5 is a block view that illustrates yet another example of a computer monitoring device according to the present embodiment.

If the input of the signal 1 can also be used as the power supply input, the signal 1 can be inputted as the power supply input to the auxiliary power supply 20 so as to operate the auxiliary power supply 20 as shown in FIG. 5.

In this way, if the power supply voltage supplied from the watchdog timer built-in 5 V regulator circuit 32 decreases, since a structure is adopted wherein the watchdog timer built-in 5 V regulator circuit 32 is switched to the auxiliary power supply 20 and the signal processing circuit 16 is operated, safe operation of the power window can be ensured during abnormal operation of the microcomputer 12.

Figure 6:
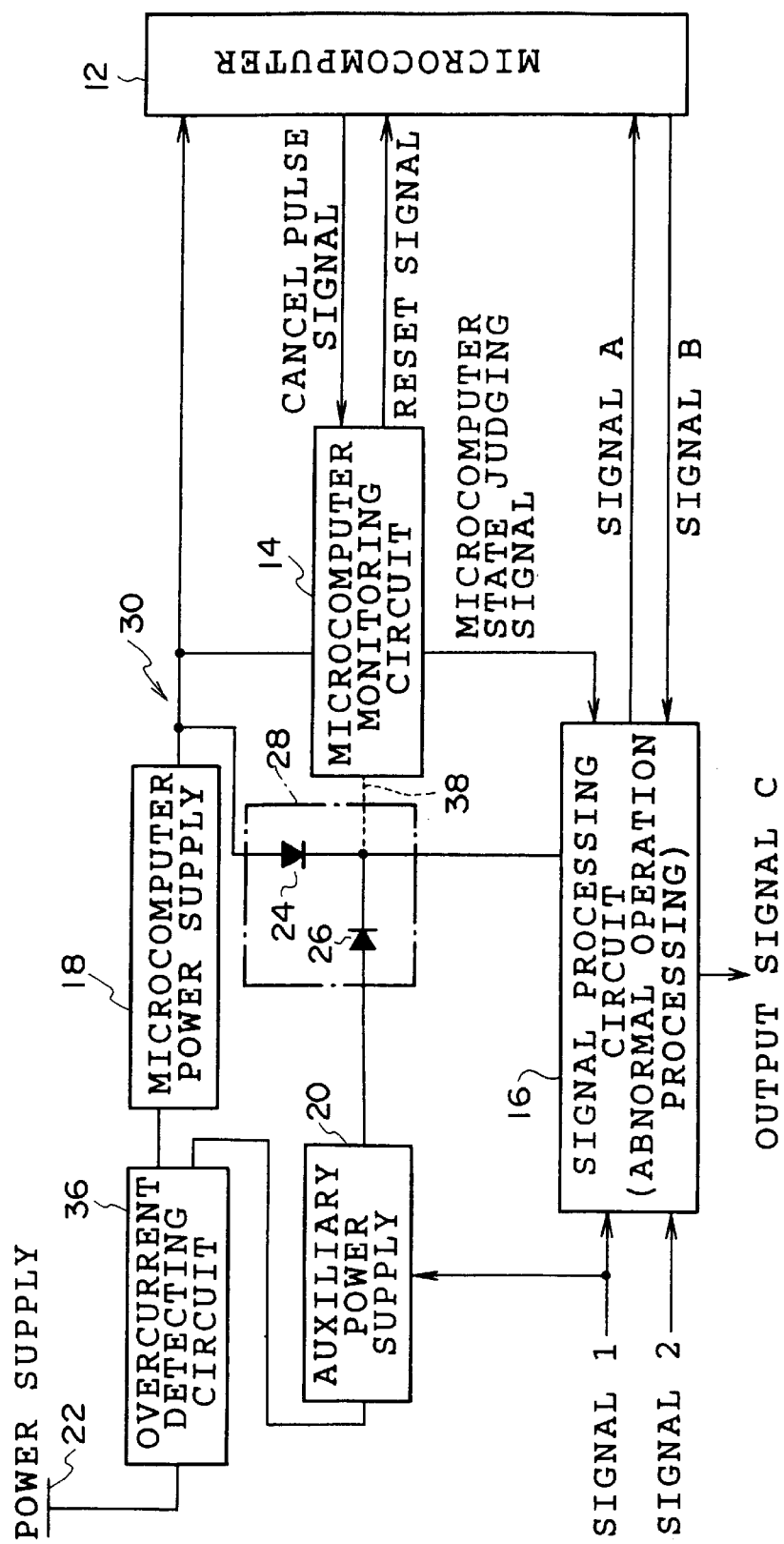
FIG. 6 is a block view that illustrates yet another example of a computer monitoring device according to the present embodiment.

Yet another example of a computer monitoring device according to the present invention is shown in FIG. 6. Portions identical to those of the computer monitoring device 10 in FIG. 1 are denoted by the same reference numerals, and a detailed description thereof will be omitted.

The computer monitoring device 30 shown in FIG. 6 has an overcurrent detecting circuit 36. The input end of the overcurrent detecting circuit 36 is connected to the power supply 22, and one output end of the overcurrent detecting circuit 36 is connected to the microcomputer power supply 18 and the other is connected to the auxiliary power supply 20.

When the overcurrent detecting circuit 36 does not detect an overcurrent (normal), the microcomputer power supply 18 operates. When the overcurrent detecting circuit 36 detects an overcurrent (abnormal), a switch is made to the auxiliary power supply 20. For this reason, even when the voltage outputted from the microcomputer power supply 18 decreases due to an overcurrent, power is supplied from the auxiliary power supply 20 to the microcomputer monitoring circuit 14 and the signal processing circuit 16 so that processing can be continued. In this case, since the microcomputer state determination signal is set at a low level (abnormal), the signal processing circuit 16 performs processing for ensuring safe operation.

If the microcomputer monitoring circuit 14 can be structured such that the microcomputer state determination signal outputted from the microcomputer monitoring circuit 14 is reliably set to be abnormal when the power supply voltage supplied from the microcomputer power supply 18 decreases, an auxiliary power supply line 38, which is shown by a dashed line in this figure, can be eliminated.

In this way, when the voltage outputted from the microcomputer power supply 18 decreases, since the auxiliary power supply 20 supplies power to the microcomputer monitoring circuit 14 and the signal processing circuit 16, safe operation can be reliably carried out.

In the present embodiment, a description of a case in which the present invention is applied to a power window system has been described. However, the present invention is not limited to this; needless to say, the present invention can be applied to an air bag system or the like.

As described above, in accordance with a first and third aspects of the present invention, an auxiliary power supply is provided for cases in which the power supply voltage supplied from a power supply circuit decreases. When the power supply voltage supplied from the power supply circuit decreases and the computer is in an abnormal state, the structure is such that the auxiliary power supply supplies power to a monitoring circuit for monitoring the state of the operation of a computer, and to an abnormality processing circuit which performs processing against abnormal operation of the computer when the computer operates abnormally. As a result, the monitoring circuit and the abnormality processing circuit can continue to operate, and processing for ensuring safe operation can be performed.

In accordance with a second aspect of the present invention, switching means are a pair of diodes whose anode sides are connected to an output end of each of the power supply circuit and the auxiliary power supply, and whose cathode sides are connected to each other. Accordingly, the power supply circuit can be switched to the auxiliary power supply in a simple manner. As a result, it is possible to prevent the power supply circuit and the auxiliary power supply from interfering with each other.

In accordance with a fourth aspect of the present invention, the auxiliary power supply is caused to operate effectively only when a predetermined signal is inputted, namely, only in cases in which safe operation must be ensured. As a result, an increase in consumption of electrical current in a waiting state in which a signal is not inputted can be prevented.

What is claimed is:

1. A computer monitoring device provided at a controller which operates a device to be controlled in accordance with a program built into a computer, comprising:

a power supply circuit that supplies power to said computer;

a monitoring circuit means that is operated by the power supplied from said power supply circuit for monitoring an operational state of said computer and for providing a reset signal to said computer;

an abnormality processing circuit that is operated by the power supplied from said power supply circuit and performs processing when said computer is operating abnormally;

an auxiliary power supply that can supply power to at least one of said monitoring circuit and said abnormality processing circuit; and switching circuit that switches from said power supply circuit to said auxiliary power supply when a voltage value of the power supplied from said power supply circuit decreases to a value lower than a predetermined voltage value.

2. A computer monitoring device according to claim 1, wherein said auxiliary power supply operates effectively only when a predetermined signal is inputted.

3. A computer monitoring device according to claim 2, wherein said predetermined signal is a power supply input that supplies power to said power supply circuit.

4. A computer monitoring device according to claim 2, wherein said predetermined signal is an ignition signal.

5. A computer monitoring device according to claim 2, wherein said power supply circuit has said monitoring circuit means built therein.

6. A computer monitoring device according to claim 1, wherein said switching circuit includes a pair of diodes whose anode sides are respectively connected to an output end of said power supply circuit and an output end of said auxiliary power supply, and whose cathode sides are connected to each other.

7. A computer monitoring device according to claim 6, wherein a voltage outputted from said auxiliary power supply is set to be lower than a voltage outputted from said power supply circuit, and is set to make possible normal operation of at least one of said monitoring circuit means and said abnormality processing circuit.

8. A computer monitoring device according to claim 6, wherein said auxiliary power supply operates effectively only when a predetermined signal is inputted.

9. A computer monitoring device according to claim 1, wherein said computer monitoring device is applied to a power window system for a vehicle.

10. A computer monitoring device provided at a controller which operates a device to be controlled in accordance with a program built into a computer, comprising:

a power supply circuit that supplies power to said computer;

a monitoring circuit means that is operated by a power supplied from said power supply circuit for monitoring an operational state of said computer and for providing a reset signal to said computer;

an abnormality processing circuit that is operated by the power supplied from said power supply circuit and performs processing when said computer is operating abnormally;

an auxiliary power supply that can supply power to at least one of said monitoring circuit and said abnormality processing circuit;

voltage detecting means that detects a voltage of said power supply circuit; and a switching control circuit that, on a basis of the detection results of said voltage detecting means, switches from said power supply circuit to said auxiliary power supply when said voltage decreases to a value lower than a predetermined value.

11. A computer monitoring device according to claim 10, wherein a voltage outputted from said auxiliary power supply is set to be equal to a voltage outputted from said power supply circuit.

12. A computer monitoring device according to claim 10, wherein said auxiliary power supply operates effectively only when a predetermined signal is inputted.

13. A computer monitoring device according to claim 12, wherein said predetermined signal is a power supply input which supplies power to said power supply circuit.

14. A computer monitoring device according to claim 12, wherein said predetermined signal is an ignition signal.

15. A computer monitoring device provided at a controller which operates a device to be controlled in accordance with a program built into a computer, comprising:

a power supply circuit controlling a voltage supplied from the power supply to be a constant voltage, and supplying power to said computer;

a monitoring circuit that is operated by the power supplied from said power supply circuit and monitors an operational state of said computer;

an abnormality processing circuit that is operated by the power supplied from said power supply circuit and performs processing when said computer is operating abnormally;

an auxiliary power supply that can supply power to at least one of said monitoring circuit and said abnormality processing circuit;

an overcurrent detecting circuit that detects an overcurrent supplied to said power supply circuit; and a switching control circuit that, on a basis of a signal output from said overcurrent detecting circuit, switches from said power supply circuit to said auxiliary power supply.

16. A computer monitoring device according to claim 15, wherein said auxiliary power supply operates effectively only when a predetermined signal is inputted.

17. A computer monitoring device, comprising:

a power supply circuit that supplies power to said computer;

a monitoring circuit that is operated by the power supplied from said power supply circuit and monitors an operational state of said computer;

an abnormality processing circuit that is operated by the power supplied from said power supply circuit and performs processing when said computer is operating abnormally;

an auxiliary power supply that can supply power to at least one of said monitoring circuit and said abnormality processing circuit; and a switching circuit that switches from said power supply circuit to said auxiliary power supply when a voltage value of the power supplied from said power supply circuit decreases to a value lower than a predetermined voltage value, such that the power is supplied to at least one of said monitoring circuit and said abnormality processing circuit.

18. A computer monitoring device according to claim 17, wherein said computer monitoring device is applied to a power window system for a vehicle.

19. A computer monitoring device provided at a controller which operates a device to be controlled in accordance with a program built into a computer, comprising:

a power supply circuit that supplies power to said computer;

a monitoring circuit that is operated by the power supplied from said power supply circuit and monitors an operational state of said computer;

an abnormality processing circuit that is operated by the power supplied from said power supply circuit and performs processing when said computer is operating abnormally;

an auxiliary power supply that can supply power to at least one of said monitoring circuit and said abnormality processing circuit;

voltage detecting means that detects a voltage of said power supply circuit; and a switching circuit that, on a basis of the detection results of said voltage detecting means, switches from said power supply circuit to said auxiliary power supply when said voltage decreases to a value lower than a predetermined value, such that the power is supplied to at least one of said monitoring circuit and said abnormality processing circuit.

20. A computer monitoring device provided at a controller which operates a device to be controlled in accordance with a program built into a computer, comprising:

a power supply circuit that supplies power to said computer;

a monitoring circuit that is operated by the power supplied from said power supply circuit and monitors an operational state of said computer;

an abnormality processing circuit that is operated by the power supplied from said power supply circuit and performs processing when said computer is operating abnormally;

an auxiliary power supply that can supply power to at least one of said monitoring circuit and said abnormality processing circuit;

a switching circuit that switches from said power supply circuit to said auxiliary power supply when a voltage value of the power supplied from said power supply circuit decreases to a value lower than a predetermined voltage value; and wherein said predetermined signal is an ignition signal.

\* \* \* \* \*